United States Patent
Hall et al.

(10) Patent No.: US 6,789,905 B2
(45) Date of Patent: Sep. 14, 2004

(54) METHOD OF PROVIDING A RETROREFLECTIVE COATING SYSTEM THROUGH WET-ON-WET APPLICATION AND A RETROREFLECTIVE COATING SYSTEM THEREOF

(75) Inventors: Jon Hall, Oxford, MI (US); Michael Jakobi, Farmington Hills, MI (US)

(73) Assignee: BASF Corporation, Southfield, MI (US)

( * ) Notice: Subject to any disclaimer, the term of this patent is extended or adjusted under 35 U.S.C. 154(b) by 506 days.

(21) Appl. No.: 09/932,803

(22) Filed: Aug. 17, 2001

(65) Prior Publication Data

US 2003/0039746 A1 Feb. 27, 2003

(51) Int. Cl.⁷ .......................... G02B 5/128; C08L 93/00
(52) U.S. Cl. ........................ 359/539; 106/228; 106/241
(58) Field of Search ........................ 359/536, 539–541; 106/228, 241; 428/142–144, 913; 427/163.4

(56) References Cited

U.S. PATENT DOCUMENTS

| 5,523,164 A | 6/1996 | Shibato et al. | 428/461 |
|---|---|---|---|
| 5,650,213 A | 7/1997 | Rizika et al. | 428/143 |
| 5,736,602 A | 4/1998 | Crocker et al. | 524/494 |
| 5,777,790 A | 7/1998 | Nakajima | 359/536 |
| 5,998,525 A | 12/1999 | Wang et al. | 524/425 |
| 6,153,671 A | 11/2000 | Schleifstein | 523/217 |
| 6,224,219 B1 | 5/2001 | Fleming et al. | 359/530 |
| 6,242,056 B1 | 6/2001 | Spencer et al. | 427/512 |
| 6,243,201 B1 | 6/2001 | Fleming et al. | 359/530 |
| 6,306,459 B1 * | 10/2001 | Fleming | 427/163.4 |
| 6,451,408 B1 * | 9/2002 | Haunschild et al. | 428/143 |

FOREIGN PATENT DOCUMENTS

| EP | 0 560 732 | 4/1993 | C09D/5/00 |
|---|---|---|---|
| WO | WO 94/27741 | 12/1994 | B05D/3/02 |
| WO | WO 99/21937 | 5/1999 | C09K/11/06 |

* cited by examiner

Primary Examiner—James Phan

(57) ABSTRACT

A retroreflective coating system and a method of providing the coating system on a substrate are disclosed. The method includes applying a color-providing composition, such as a pigmented basecoat composition, and applying a clearcoat composition. After application and cure, the color-providing composition forms a color-providing film layer, and the clearcoat composition forms a clearcoat film layer. The color-providing composition and the clearcoat composition are cross-linkable. Either one, or both, of the color-providing composition and the clearcoat composition include retroreflective microspheres. The color-providing composition is applied to the substrate to form an uncured film layer of the color-providing composition. Next, the clearcoat composition is applied wet-on-wet to the uncured film layer of the color-providing composition such that an uncured film layer of the clearcoat composition is formed on the uncured film layer of the color-providing composition.

35 Claims, 1 Drawing Sheet

METHOD OF PROVIDING A RETROREFLECTIVE COATING SYSTEM THROUGH WET-ON-WET APPLICATION AND A RETROREFLECTIVE COATING SYSTEM THEREOF

FIELD OF THE INVENTION

The subject invention generally relates to a retroreflective coating system and a method of providing the retroreflective coating system on a substrate. More specifically, the subject invention relates to a cross-linkable, retroreflective coating system that includes retroreflective microspheres for wet-on-wet application to an automotive body panel.

BACKGROUND OF THE INVENTION

Use of retroreflective and reflective microspheres is known. For instance, U.S. Pat. No. 5,650,213 incorporates retroreflective microspheres into retroreflective compositions that are used on fabrics and the like to enhance the retroreflectivity of the fabrics. Clothing made of retroreflective fabric improves the safety of pedestrians who wear the clothing at nighttime because the pedestrians are more visible to others. Use of reflective microspheres in automotive and other coating systems is also known in the art. For instance, U.S. Pat. No. 6,242,056 incorporates reflective microspheres into reflective, heat-cured coating systems to enhance the light emission, refraction, and diffusion of the coating system.

The conventional use of retroreflective and reflective microspheres in conventional coating systems is inadequate for various reasons. Many compositions that are used to form the coating systems with the retroreflective microspheres are not cross-linkable. As a result, these compositions are not suitable for automotive coating systems where durability and the physical integrity of the coating system, relative to weathering and exposure, is paramount. Furthermore, many coating systems, such as the coating system of the '056 patent, are not retroreflective coating systems. Instead, these systems only incorporate reflective microspheres that primarily serve to enhance various aesthetic properties of the coating system, such as color. These systems are also not ideal for automotive coating systems. Simply stated, because these systems are not retroreflective, they do not optimally enhance the visibility of a vehicle having the coating system and, as a result, they do not optimally enhance the safety of pedestrians who need to watch for vehicles at nighttime for their own protection.

The conventional use of retroreflective and reflective microspheres in conventional coating systems is also inadequate because the microspheres in these coating systems must be completely encapsulated within a particular film layer to be able to produce the desired light emission, refraction, and diffusion. An example of such a coating system is disclosed in the '056 patent. These conventional coating systems of the prior art typically require cures, or bakes, between each film layer of the coating system (i.e., multiple, sequential cures) to achieve complete encapsulation of the microspheres within the particular film layer. These systems also typically require cures between each film layer to ensure that the coating system, having the microspheres, achieves a satisfactory gloss. These coating systems are inadequate because they do not allow for wet-on-wet application of the various film layers that make up the coating system. Wet-on-wet application of the various film layers to make up the coating system is not feasible for the coating systems of the prior art because these systems only achieve satisfactory gloss with cures between each film layer. It is widely known throughout the art that any method requiring cures for each film layer of a coating system is time consuming and expensive because costly ovens must be used for each cure.

In sum, the coating systems and compositions of the prior art, primarily the uses of the retroreflective and reflective microspheres in these coating systems and compositions, are characterized by one or more inadequacy. As a result, it is desirable to implement a method of providing a retroreflective coating system that includes applying the coating system wet-on-wet to a substrate, such as an automotive body panel. The retroreflective coating system is cross-linkable, includes retroreflective microspheres, and achieves a satisfactory gloss with wet-on-wet application to the substrate.

SUMMARY OF THE INVENTION

A retroreflective coating system and a method of providing the retroreflective coating system are disclosed. The retroreflective coating system is provided on a substrate. The method includes the steps of applying a color-providing composition and an at least partially-transparent clearcoat composition. Either one, or both, of the color-providing composition and the clearcoat composition is cross-linkable. Furthermore, either one, or both, of the color-providing composition and the clearcoat composition includes retroreflective microspheres. The retroreflective coating system includes a color-providing film layer formed from the color-providing composition, and an at least partially-transparent clearcoat film layer formed form the clearcoat composition.

The color-providing composition is applied to the substrate. Application of the color-providing composition to the substrate forms an uncured film layer of the color-providing composition. The method also includes the step of applying the clearcoat composition to the uncured film layer of the color-providing composition. More specifically, the clearcoat composition is applied to the color-providing composition wet-on-wet. An uncured film layer of the clearcoat composition is formed on the uncured film layer of the color providing composition upon application of the clearcoat composition.

Accordingly, the subject invention offers a retroreflective coating system and a method that provides a retroreflective coating system that is cross-linkable and that includes retroreflective microspheres for wet-on-wet application of the coating system to a substrate. Because the retroreflective coating system of the subject invention is cross-linkable, it is durable. Furthermore, the retroreflective coating system provided according to the method of the subject invention, is able to achieve satisfactory gloss and retroreflectivity for the substrate even with wet-on-wet application of the various film layers of the coating system. As a result, the method of providing the retroreflective coating system is cost-efficient, and the retroreflective coating system optimally enhances the visibility of the substrate to others to ensure safety.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
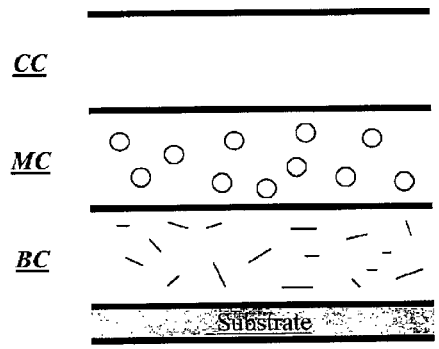
FIG. 1 is a schematic representation of a retroreflective coating system illustrating retroreflective microspheres dis

A method of providing a retroreflective coating system on a substrate includes the steps of applying a color-providing composition and applying an at least partially-transparent clearcoat composition. For descriptive purposes of the subject invention, "at least partially-transparent" is intended to describe fully-transparent clearcoat compositions as well as partially-transparent clearcoat compositions. Partially-transparent clearcoat compositions generally transmit at least 10%, preferably at least 30%, of incident light. The at least partially-transparent clearcoat composition is hereinafter referred to as the "clearcoat composition." Furthermore, in all embodiments of the subject invention, the color-providing composition and the clearcoat composition are preferably liquids that are spray applied to the substrate by air- or rotary-atomized application equipment known in the art. However, it is to be understood that these compositions may also be powder or powder slurry compositions, and may even be applied with different application methods including, but not limited to, electrodeposition.

The color-providing composition is applied to the substrate thereby forming an uncured, or wet, film layer of the color-providing composition. The clearcoat composition is applied wet-on-wet to the uncured film layer of the color-providing composition thereby forming an uncured film layer of the clearcoat composition on the uncured film layer of the color-providing composition. It is to be understood that, for purposes of the subject invention, if the color-providing composition or the clearcoat composition are based on waterborne technology, then the terminology "uncured" is intended to include the pre-bake or pre-cure conditions (i.e., the low bakes or warm air drying) that are typically associated with compositions of waterborne technology. The step of applying the color-providing composition and the step of applying the clearcoat composition, as initially set forth above, are described in greater detail below. The retroreflective coating system provided by these steps includes a color-providing film layer formed from the color-providing composition, and an at least partially-transparent clearcoat film layer formed form the clearcoat composition.

The color-providing compositions suitable to be utilized in the subject invention include any of a number of types of color-providing compositions known in the art. For the purposes of the subject invention, the types of color-providing compositions do not require explanation in detail as the particular color-providing composition that is utilized does not vary the scope of the subject invention.

Generally, the types of color-providing compositions suitable for application in the subject invention include, but are not limited to, solvent borne and waterborne compositions, refinish and OEM-type compositions, and thermosetting and thermoplastic compositions. More specifically, polymers known in the art to be useful in the color-providing compositions include acrylics, vinyls, polyurethanes, polycarbonates, polyesters, alkyds and polysiloxanes. Preferred polymers include acrylics, polyurethanes, and polyesters. As indicated above, the polymer in the color-providing composition may be thermoplastic, but is preferably cross-linkable and therefore includes one or more cross-linkable functional group. Suitable cross-linkable functional groups include, but are not limited to, hydroxy, isocyanate, acid, amine, epoxy, acrylate, vinyl, silane, anhydride, and acetoacetate cross-linkable functional groups. The cross-linkable functional groups may be masked or blocked in such a manner that they become unblocked and therefore available for cross-linking under preferred cure conditions, such as elevated temperatures. These polymers may be self cross-linkable, or may require a separate cross-linking agent that is reactive with the cross-linkable functional groups of the polymer. For example, when the polymer includes a hydroxy cross-linkable functional group, the cross-linking agent may be an aminoplast resin, such as melamine, an isocyanate cross-linking agent, a blocked isocyanate cross-linking agent, an acid, or an anhydride cross-linking agent.

Similarly, the clearcoat compositions suitable to be utilized in the subject invention include any of a number of types of clearcoat compositions known in the art. For the purposes of the subject invention, the types of clearcoat compositions do not require explanation in detail as the particular clearcoat composition that is utilized does not vary the scope of the subject invention.

Generally, the types of clearcoat compositions suitable for application in the subject invention include, but are not limited to, solventborne and waterborne clearcoat compositions, refinish and OEM-type clearcoat compositions, powder and powder slurry clearcoat compositions, and thermosetting and thermoplastic clearcoat compositions. More specifically, polymers known in the art to be useful in the clearcoat compositions include acrylics and polyurethanes cross-linkable with melamine or isocyanate. Polymers for the clearcoat composition preferably have a cross-linkable functional group including, but not limited to, hydroxy, phenol, amino, carboxyl, epoxy, or mercaptan functional groups. Other clearcoat compositions suitable for use in the subject invention are based on carbonate chemistry, carbamate chemistry, and silane chemistry as known in the art. Suitable cross-linking agents reactive with the cross-linkable functional group of the polymer in the clearcoat composition include, but are not limited to, melamine, blocked and unblocked isocyanate, and combinations thereof. As understood by those skilled in the art, the clearcoat composition may include additional components such as ultraviolet light absorbers, hindered amine light stabilizers, surfactants, stabilizers, fillers, wetting agents, rheology control agents, dispersing agents and adhesion promoters. While use of these additional components in clearcoat compositions is well known in the art, the amount or amounts used are varied and controlled to avoid adversely affecting various physical properties of the retroreflective coating system.

Although it is preferred that both the color-providing composition and the clearcoat composition are cross-linkable, only one of the color-providing composition and the clearcoat composition need be cross-linkable. Furthermore, as emphasized above, the type of cross-linking agent responsible for cross-linking in the color-providing composition, the clearcoat composition, or both, is not critical because the particular type of cross-linking agent utilized does not vary the scope of the subject invention.

At least one of the color-providing composition and the clearcoat composition include retroreflective microspheres or beads. That is, depending on the particular embodiments described below, the color-providing composition, the clearcoat composition, or even both compositions may include the retroreflective microspheres. The retroreflective microspheres provide the retroreflectivity for the retroreflective coating system on the substrate. The retroreflective microspheres provide the retroreflectivity because the rays of light reflected from the retroreflective coating system are parallel to the corresponding incident rays of light. For descriptive purposes, the retroreflective coating system of the subject invention is hereinafter referred to as the "coating system."

The retroreflective microspheres have an average diameter of from 10 to 100. Average diameters ranging from 20 to 70 microns and from 30 to 60 microns provide coating systems with excellent reflectivity. Of course, it is to be understood that the preferred average diameter of the retroreflective microspheres may vary with the film build of the coating system. As such, coating systems with larger film builds can accommodate retroreflective microspheres of a larger average diameter. The retroreflective microspheres have a refractive index of from 1.5 to 2.2. The most preferred retroreflective microspheres are commercially available from Reflective Technologies Industries, Ltd., a subsidiary of Reflec Plc., located in Winsford, Chesire, United Kingdom. Finally, although it is not preferred, the retroreflective microspheres may be included in more than one composition at the same time. That is, the retroreflective microspheres may be included in both the color-providing composition and the clearcoat composition in one coating system.

For purposes of the subject invention, the terminology of color-providing composition is intended to include any composition that can modify an original color of an underlying substrate. General examples of such color-providing compositions include, without limitation, pigmented basecoat compositions having organic pigments, inorganic pigments, metallic flakes, and/or mica flakes; clear binder compositions including the retroreflective microspheres; and partially-clear or transparent binder compositions such as tinted clearcoat compositions as known in the art.

As described above, the retroreflective microspheres provide the retroreflectivity for the coating system on the substrate. Although the coating system is preferably provided on a body panel of an automobile, i.e., an automotive body panel, as the substrate or on an automotive component, the coating system may be applied to other suitable substrates such as concrete, blacktop, highway markers, construction markers, boats, airplanes, recreational vehicles, appliances, and the like. Furthermore, although the coating system is preferably applied to an automotive body panel that is metallic, the coating system may alternatively be applied to other automotive body panels or components including, but not limited to, plastic substrates such as a bumper, mirror, or internal dashboard of the automobile, aluminum substrates, and galvanized steel substrates.

Depending on the embodiment, the color-providing composition includes from 1 to 40, preferably from 10 to 20, parts by weight of the retroreflective spheres based on 100 parts by weight of the color-providing composition, and from 5 to 40, preferably from 8 to 25, parts by weight of pigment based on 100 parts by weight of the color-providing composition. Also depending on the embodiment, the clearcoat composition includes from 1 to 40, preferably from 10 to 20, parts by weight of the retroreflective microspheres based on 100 parts by weight of the clearcoat composition. In addition to the retroreflective microspheres, at least one, or even both, of the color-providing composition and the clearcoat composition may further include a phosphorescent pigment. One suitable phosphorescent pigment is commercially available as LumiNova® Green (G-300 FFS) from Nemoto & Co., Ltd., Tokyo, Japan.

In all embodiments of the subject invention, the uncured film layers of the color-providing composition and the clearcoat composition are simultaneously cured such that one, or both, of the color-providing composition and the clearcoat composition cross-links. Although various methods may be used for curing, heat-curing is preferred. Generally, heat curing is conducted by exposing the coating system on the substrate to elevated temperatures provided primarily by radiating heat sources. As understood by those skilled in the art, preferred conditions for cure vary depending on the type (i.e., the chemistry and polymer make-up) of the color-providing composition and the clearcoat composition. More specifically, curing temperatures vary depending on the particular blocking groups used in the cross-linking agents. Generally, however, the curing temperatures range from 250 degree F. to 385 degree F. The duration of the cure may also vary depending on the chemistry and polymer make-up, on the particular cross-linking agents, and on physical parameters of the coating system such as the film build. Generally, the duration of the cure ranges from 15 to 60 minutes.

As a result of the cure, at least one of these compositions cross-links to provide the coating system. Upon cure, the coating system, including the film layers formed from the wet-on-wet application of the clearcoat composition to the color-providing composition, has a gloss of at least 75, preferably of at least 85, in one embodiment, and a gloss of less than 75 in an alternative embodiment. The gloss of the coating system is measured as described in ASTM D523-89 (Re-Approved 1999) and is described in greater detail below in terms of particular embodiments.

Upon simultaneous cure, a film build of the coating system is established. The film build of the coating system ranges from 10 to 100, more preferably from 30 to 90, microns. It is to be understood that the film build of the coating system is the total film build of all of the film layers. In one embodiment of the subject invention, a portion of the film build, specifically an outermost portion of the film build, is removed after the simultaneous cure of the film layers. Removal of the portion of the film build increases the exposure of the retroreflective microspheres to an external light source thereby making the coating system more retroreflective. Removing the portion of the film build is preferably completed by sanding, more preferably by wet sanding, the portion of the film build after the simultaneous cure. The particular grit sandpaper that may be selected for appropriate removal of the portion of the film build varies as understood in the art. Additionally, other polishing applications having the effect of removing a portion of the film build may be employed. In preferred embodiments of the subject invention, it is estimated that a portion equal to from 2 to 15, more preferably from 3 to 10, microns is removed to increase the exposure of the retroreflective spheres to the external light source.

Referring now to the particular embodiment schematically represented in FIG. 1, the color-providing composition is applied to the substrate, and the uncured film of the color-providing composition is formed. The color-providing composition more specifically includes a first color-providing composition and a second color providing composition. The first color-providing composition is applied to the substrate thereby forming an uncured film layer of the first color-providing composition, and the second color-providing composition is applied wet-on-wet to the uncured layer of the first color-providing composition. An uncured film layer of the second color-providing composition is formed on the uncured film layer of the first color-providing composition. Ultimately, i.e., after cure, a first color-providing film layer is formed from the first color-providing composition, and a second color-providing film layer, different from the first color-providing film layer, is formed from the second color-providing composition.

The step of applying the first color-providing composition to the substrate is further defined as applying a pigmented basecoat composition to the substrate. The pigmented basecoat composition is represented by "BC" in FIG. 1. As a result, the uncured film layer of the first color-providing composition is formed of the pigmented basecoat composition. After cure, a pigmented basecoat film layer is formed from the pigmented basecoat composition. The pigmented basecoat composition preferably includes from 5 to 40, more preferably from 8 to 25, parts by weight of pigment based on 100 parts by weight of the pigmented basecoat composition. In the most preferred embodiment of the subject invention, the pigmented basecoat composition that is applied to the substrate is further defined as a pigmented basecoat composition including an aluminum pigment. The aluminum pigment is represented schematically throughout the Figures in the pigmented basecoat composition. As understood in the art, the flake-like aluminum pigment reflects light, and in doing so, functions as a 'backdrop' that causes light to more effectively interact with the retroreflective microspheres thereby enhancing the retroreflective effect provided by the retroreflective microspheres.

Of course, it is to be understood that other pigments, both organic and inorganic, may be included in the pigmented basecoat composition without varying the scope of the subject invention. Suitable organic pigments include, but are not limited to, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Specific examples of suitable pigments include, without limitation, quinacridone pigments, such as C.I. Pigment Red 202, C.I. Pigment Violet 19, and C.I. Pigment Red 122; perylene pigments, such as C.I. Pigment Red 179; azo condensation pigments, such as C.I. Pigment Red 170, C.I. Pigment Red 144, and C.I. Pigment Brown 23; isoindolinone pigments, such as C.I. Pigment Orange 61, C.I. Pigment Yellow 109, and C.I. Pigment Yellow 110; diketopyrrolopyrrole pigments, such as C.I. Pigment Red 254, C.I. Pigment Red 255, C.I. Pigment Red 264, C.I. Pigment Orange 71, and C.I. Pigment Orange 73; copper phthalocyanine pigments such as C.I. Pigment Blue 15; and anthraquinone pigments, such as C.I. Pigment Blue 60, C.I. Pigment Red 177, and C.I. Pigment Yellow 147. Suitable inorganic pigments include, but are not limited to, oxide pigments such as titanium dioxide, carbon black, iron oxides including red iron oxide, black iron oxide, and brown iron oxide, chromium oxide green, ferric ferrocyanide (Prussian blue), ultramarine, lead chromate, and the like. Other optional pigments include, mica flakes and color-variable pigments such as coated aluminum flakes.

The step of applying the second color-providing composition wet-on-wet to the uncured film layer of the first color-providing composition is further defined as applying a mid-coat composition wet-on-wet to the uncured film layer of the pigmented basecoat composition. In this embodiment, the mid-coat composition, represented by "MC" in FIG. 1, includes the retroreflective microspheres. The uncured film layer of the second color-providing composition is formed of the mid-coat composition including the retroreflective microspheres. Upon cure, a mid-coat film layer, including the retroreflective microspheres is formed from the mid-coat composition. The mid-coat composition preferably includes from 1 to 40, more preferably from 10 to 20, parts by weight of the retroreflective microspheres based on 100 parts by weight of the mid-composition. As one of the color-providing compositions, the mid-coat composition may be based on any of the types of chemistries and polymers set forth above for the color-providing compositions, including the preferred polymers of acrylic, polyurethane, and polyester. In the most preferred embodiment, the mid-coat composition is free from pigment other than the retroreflective microspheres. However, it is to be understood that the mid-coat composition may alternatively include the other pigments, both organic and inorganic, as set forth above.

In this embodiment, with the mid-coat composition present, the step of applying the clearcoat composition is further defined as applying the clearcoat composition wet-on-wet-on-wet to the uncured film layers of the mid-coat composition and the pigmented basecoat composition. The clearcoat composition is represented by "CC" in FIG. 1. As a result, the clearcoat composition at least partially covers the retroreflective microspheres in the mid-coat composition.

After the clearcoat composition is applied wet-on-wet-on-wet, the uncured film layers of the pigmented basecoat composition, the mid-coat composition, and the clearcoat composition are simultaneously cured to provide the coating system with the retroreflective microspheres in the mid-coat composition as shown in FIG. 1. Curing of the pigmented basecoat composition, the mid-coat composition, and the clearcoat composition forms the pigmented basecoat film layer, the mid-coat film layer, and the clearcoat film layer, respectively. Upon cure, at least one of the compositions cross-links, and the coating system, in this embodiment, achieves a 60 degree gloss of at least 75, and higher, preferably at least 85 depending on the average diameter of the retroreflective microspheres, as defined by ASTM D523-89 (Re-Approved 1999). The 60 degree gloss is measured with a BYK-Gardner Micro-Gloss Meter, specifically Model No. GB-4501. Alternatively, a BYK-Gardner Haze-Gloss Meter, preferably Model Nos. GB-4601 and GB-4606, may be utilized having a different scale of gloss units.

Figure 2:
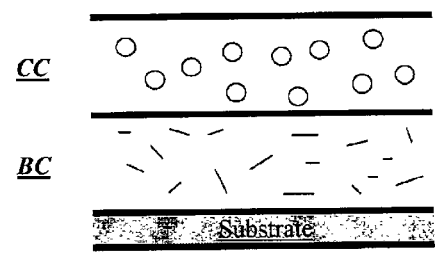
- FIG. 2 is a schematic representation of the retroreflective coating system illustrating the retroreflective microspheres disposed in the clearcoat film layer which is applied to the pigmented basecoat film layer.

Referring now to the embodiment disclosed in FIG. 2, the step of applying the color-providing composition is further defined just as in the previous embodiment. That is, the step of applying the color-providing composition is further defined as applying the pigmented basecoat composition ("BC") to the substrate such that the uncured film layer of the first color-providing composition is formed of the pigmented basecoat composition. As a result, the description above pertaining to the pigmented basecoat composition is also applicable in this embodiment.

The embodiment in FIG. 2, does not include a mid-coat composition including the retroreflective microspheres. Instead, the retroreflective microspheres are included in the clearcoat composition ("CC"). More specifically, the step of applying the clearcoat composition is further defined as applying the clearcoat composition, which includes the retroreflective microspheres, wet-on-wet to the uncured film layer of the pigmented basecoat composition.

In this embodiment, after the clearcoat composition is applied wet-on-wet, the uncured film layers of the pigmented basecoat composition and the clearcoat composition are simultaneously cured to provide the coating system with the retroreflective microspheres in the clearcoat composition as shown in FIG. 2. More specifically, the simultaneous cure of the pigmented basecoat composition and the clearcoat composition forms the basecoat and clearcoat film layers, respectively. Upon cure, at least one of the compositions cross-links, and the coating system, in this embodiment, has a 60 degree gloss of less than 75, as defined by ASTM D523-89 (Re-Approved 1999). This 60 degree gloss is also measured with the BYK-Gardner Micro-Gloss Meter Model No. GB-4501. In this embodiment, with the retroreflective microspheres in an outermost film layer of the coating system, a specialized low gloss automotive coating is provided. With the retroreflective microspheres in the outermost film layer, the clearcoat film layer, optimum gloss is partially sacrificed for optimum retroreflectivity and other aesthetic effects.

To improve the gloss of the embodiment disclosed FIG. 2, the method further includes the step of applying a second at least partially-transparent clearcoat composition. The second clearcoat composition is represented by "CC No. 2" in FIG. 3. The second clearcoat composition may be based on any of the types of chemistries and polymers set forth above for the clearcoat composition. As disclosed in FIG. 3, the second clearcoat composition is free of retroreflective microspheres. When the film layers of the pigmented basecoat composition and the clearcoat composition have already been cured, the second clearcoat composition is applied to the cured film layers, and an uncured film layer of the second clearcoat composition is formed. After application, the uncured film layer of the second clearcoat composition is then cured and forms a second at least partially-transparent clearcoat film layer. The coating system, having the retroreflective beads in the film layer of the clearcoat composition, improves the 60 degree gloss to at least 75, preferably to at least 85, as defined by ASTM D523-89 (Re-Approved 1999) and as measured with the BYK-Gardner Micro-Gloss Meter Model No. GB-4501.

Figure 3:
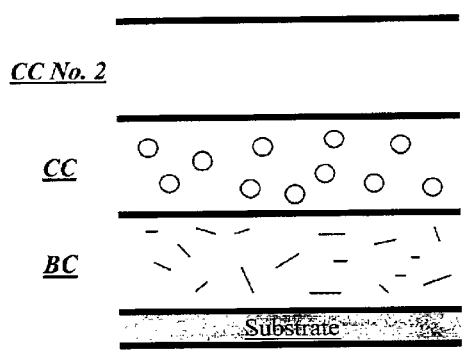
FIG. 3 is a schematic representation of the retroreflective coating system of FIG. 2 illustrating a second clearcoat film layer applied to the clearcoat film layer to enhance gloss of the coating system.

Referring back to the embodiment disclosed in FIG. 2, the second clearcoat composition, which is free of retroreflective microspheres, may be applied before any cure of the pigmented basecoat composition and of the clearcoat composition. That is, the second clearcoat composition may be applied wet-on-wet-on-wet to the uncured film layers of the clearcoat composition and the pigmented basecoat composition. In this embodiment, which is also represented by FIG. 3, the uncured film layer of the second clearcoat composition is formed on the uncured film layers of the clearcoat composition and the pigmented basecoat composition, and a simultaneous cure of all of the uncured film layers is used. That is, the uncured film layers of the pigmented basecoat composition, the clearcoat composition including the retroreflective microspheres, and the second clearcoat composition are simultaneously cured to provide the coating system with the retroreflective microspheres in the clearcoat composition. Specifically, the uncured film layers of the pigmented basecoat composition, the clearcoat composition, and the second clearcoat composition form the pigmented basecoat film layer, the clearcoat film layer, and the second clearcoat film layer, respectively. Upon cure, at least one of the compositions cross-links, and this particular coating system also improves the 60 degree gloss to at least 75, preferably to at least 85, as defined by ASTM D523-89 (Re-Approved 1999) and as measured with the BYK-Gardner Micro-Gloss Meter Model No. GB-4501.

Figure 4:
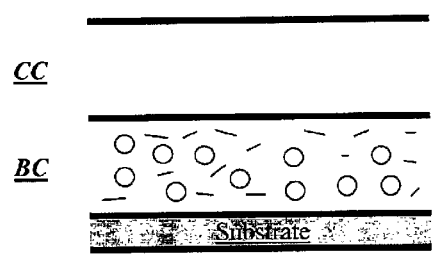
FIG. 4 is a schematic representation of the retroreflective coating system illustrating the retroreflective microspheres disposed in the pigmented basecoat film layer.

Referring now to FIG. 4, the step of applying the color-providing composition is further defined as applying a pigmented basecoat composition ("BC") to the substrate that includes the retroreflective microspheres. As a result, the uncured film layer of the color-providing composition is further defined as a pigmented basecoat film layer formed of the pigmented basecoat composition including the retroreflective microspheres. The clearcoat composition ("CC") is then applied wet-on-wet to the uncured film layer of the pigmented basecoat composition to at least partially cover the retroreflective microspheres in the pigmented basecoat composition.

The uncured film layers of the pigmented basecoat composition, having the retroreflective microspheres, and the clearcoat composition are then simultaneously cured thereby forming the pigmented basecoat film layer and the clearcoat film layer, respectively. At least one the pigmented basecoat composition and the clearcoat composition cross-links to provide the coating system with the retroreflective microspheres in the pigmented basecoat composition. Because the outermost film layer of this embodiment, the clearcoat film layer, is free of retroreflective microspheres, this coating system also achieves an optimum 60 degree gloss of at least 75, preferably of at least 85, as described above.

The following Example illustrating the formation of the retroreflective coating system according to the subject invention, as presented herein, is intended to illustrate and not limit the invention.

EXAMPLE

The retroreflective coating system was prepared by adding and reacting the following parts, by weight, unless otherwise indicated.

| Retroreflective Coating System | Amount (grams) |
|---|---|
| Pigmented Basecoat Composition | |
| Polymer Component (polyester-based) | 90.0 |
| Pigment Component | 10.0 |
| (aluminum pigment) | |
| Total | 100.0 |
| Mid-Coat Composition | |
| Polymer Component (polyester-based) | 83.2 |
| Retroreflective Microspheres | 16.8 |
| Total | 100.0 |
| Clearcoat Composition | |
| Clearcoat Polymer Component | 70.0 |
| Clearcoat Cross-Linking Agent (isocyanate-based) | 20.0 |

| Retroreflective Coating System | Amount (grams) |
|---|---|
| Spray Reduction Agent | 10.0 |
| Total | 100.0 |

The above Example is a representation of the embodiment described above with reference to FIG. 1. The pigmented basecoat composition includes 90.0 parts by weight of a polyester-based polymer and 10.0 parts by weight of an aluminum pigment component, both based on 100 parts by weight of the pigmented basecoat composition. In this Example, the mid-coat composition includes the retroreflective microspheres. More specifically, the mid-coat composition includes 83.2 parts by weight of the polyester-based polymer and 16.8 parts by weight of the retroreflective microspheres, all based on 100 parts by weight of the mid-coat composition. Finally, the clearcoat composition is the composition of the retroreflective coating system that is cross-linkable. Specifically, the clearcoat composition includes 70.0 parts by weight of a clearcoat polymer component, 20.0 parts by weight of an isocyanate-based clearcoat cross-linking agent, and 10.0 parts by weight of a spray reduction agent, based on 100 parts by weight of the clearcoat composition. The spray reduction agent is known in the art for optimum application of the clearcoat composition.

The pigmented basecoat composition, the mid-coat composition, and the clearcoat composition were each individually spray applied wet-on-wet-on-wet to the substrate. After application, the compositions were simultaneously cured to provide the retroreflective coating system with the retroreflective microspheres in the mid-coat composition. In this Example, although not preferred, the clearcoat film layer formed from the clearcoat composition was wet sanded to remove a portion of the coating system and to optimize the retroreflectivity provided by the retroreflective microspheres. The portion of the coating system that was removed, in this Example, was approximately 5 microns. This coating system resulted in a satisfactory 60 degree gloss ranging from 85 to 92 as defined by ASTM D523-89 (Re-Approved 1999). The BYK-Gardner Micro-Gloss Meter Model No. GB-4501 was used to evaluate the gloss.

Finally, the above Example is understood by those skilled in the art to be generally representative of a typical refinish-type coating system where the pigmented basecoat composition and the mid-coat coating composition are not cross-linkable, and the clearcoat composition is cross-linkable. It is to be understood that OEM-type coating systems, where the pigmented basecoat composition, the mid-coat composition, and the clearcoat composition are all cross-linkable, are also preferred.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A retroreflective coating system comprising:
a substrate;
a color-providing film layer formed from a color-providing composition applied to said substrate; and
an at least partially-transparent clearcoat film layer formed from an at least partially-transparent clearcoat composition applied wet-on-wet to said color-providing composition as said color-providing composition is uncured;
wherein at least one of said color-providing composition and said clearcoat composition is cross-linkable, and at least one of said color-providing composition and said clearcoat composition comprises retroreflective microspheres.

2. A retroreflective coating system as set forth in claim 1 wherein said color-providing film layer comprises a first color-providing film layer and a second color-providing film layer different from said first color-providing film layer.

3. A retroreflective coating system as set forth in claim 2 wherein said first color-providing film layer is further defined as a pigmented basecoat film layer formed from a pigmented basecoat composition applied to said substrate.

4. A retroreflective coating system as set forth in claim 3 wherein said pigmented basecoat composition comprises from 5 to 40 parts by weight of pigment based on 100 parts by weight of said pigmented basecoat composition.

5. A retroreflective coating system as set forth in claim 3 wherein said pigmented basecoat composition comprises aluminum pigment.

6. A retroreflective coating system as set forth in claim 3 wherein said second color-providing film layer is further defined as a mid-coat film layer formed from a mid-coat composition comprising said retroreflective microspheres and being applied wet-on-wet to said pigmented basecoat composition as said pigmented basecoat composition is uncured.

7. A retroreflective coating system as set forth in claim 6 wherein said mid-coat composition comprises from 1 to 40 parts by weight of said retroreflective microspheres based on 100 parts by weight of said mid-coat composition.

8. A retroreflective coating system as set forth in claim 6 wherein said clearcoat composition is applied wet-on-wet-on-wet to said mid-coat composition and said pigmented basecoat composition to at least partially cover said retroreflective microspheres in said mid-coat composition.

9. A retroreflective coating system as set forth in claim 8 wherein said pigmented basecoat composition, said mid-coat composition, and said clearcoat composition are simultaneously cured to form said pigmented basecoat film layer, said mid-coat film layer, and said clearcoat film layer, respectively.

10. A retroreflective coating system as set forth in claim 9 having a 60 degree gloss of at least 75, as defined by ASTM D523-89 (Re-Approved 1999).

11. A retroreflective coating system as set forth in claim 1 wherein said color-providing film layer is further defined as a pigmented basecoat film layer formed from a pigmented basecoat composition applied to said substrate.

12. A retroreflective coating system as set forth in claim 11 wherein said clearcoat composition comprises said retroreflective microspheres and is applied wet-on-wet to said pigmented basecoat composition as said pigmented basecoat composition is uncured.

13. A retroreflective coating system as set forth in claim 12 wherein said pigmented basecoat composition and said clearcoat composition are simultaneously cured to form said pigmented basecoat film layer and said clearcoat film layer, respectively.

14. A retroreflective coating system as set forth in claim 13 having a 60 degree gloss of less than 75, as defined by ASTM D523-89 (Re-Approved 1999).

15. A retroreflective coating system as set forth in claim 13 further comprising a second at least partially-transparent clearcoat film layer formed from a second at least partially-transparent clearcoat composition applied to said clearcoat film layer and said pigmented basecoat film layer wherein said second clearcoat composition is free of retroreflective microspheres.

16. A retroreflective coating system as set forth in claim 15 wherein said second clearcoat composition is cured to form said second clearcoat film layer.

17. A retroreflective coating system as set forth in claim 12 further comprising a second at least partially-transparent clearcoat film layer formed from a second at least partially-transparent clearcoat composition applied wet-on-wet-on-wet to said clearcoat composition and said pigmented basecoat composition wherein said second clearcoat composition is free of retroreflective microspheres.

18. A retroreflective coating system as set forth in claim 17 wherein said pigmented basecoat composition, said clearcoat composition, and said second clearcoat composition are simultaneously cured to form said pigmented basecoat film layer, said clearcoat film layer, and said second clearcoat film layer, respectively.

19. A retroreflective coating system as set forth in claim 1 wherein said color-providing film layer is further defined as a pigmented basecoat film layer formed from a pigmented basecoat composition comprising said retroreflective microspheres and being applied to said substrate.

20. A retroreflective coating system as set forth in claim 19 wherein said clearcoat composition is applied wet-on-wet to said pigmented basecoat composition to at least partially cover said retroreflective microspheres in said pigmented basecoat composition.

21. A retroreflective coating system as set forth in claim 20 wherein said pigmented basecoat composition and said clearcoat composition are simultaneously cured to form said pigmented basecoat film layer and said clearcoat film layer, respectively.

22. A retroreflective coating system as set forth in claim 1 wherein said retroreflective microspheres have an average diameter of from 10 to 100 microns.

23. A retroreflective coating system as set forth in claim 1 wherein said retroreflective microspheres have a refractive index of from 1.5 to 2.2.

24. A retroreflective coating system as set forth in claim 1 wherein said color-providing composition comprises from 1 to 40 parts by weight of said retroreflective microspheres based on 100 parts by weight of said color-providing composition.

25. A retroreflective coating system as set forth in claim 1 wherein said clearcoat composition comprises from 1 to 40 parts by weight of said retroreflective microspheres based on 100 parts by weight of said clearcoat composition.

26. A retroreflective coating system as set forth in claim 1 wherein said color-providing composition comprises from 5 to 40 parts by weight of pigment based on 100 parts by weight of said color-providing composition.

27. A retroreflective coating system as set forth in claim 1 wherein said color-providing composition is spray applied to said substrate, and said clearcoat composition is spray applied wet-on-wet to said color-providing composition.

28. A retroreflective coating system as set forth in claim 1 wherein said substrate is an automotive body panel.

29. A retroreflective coating system as set forth in claim 1 wherein said color-providing composition and said clearcoat composition are simultaneously cured to form said color-providing film layer and said clearcoat film layer, respectively, wherein at least one of said color-providing composition and said clearcoat composition cross-links as a result of the cure.

30. A retroreflective coating system as set forth in claim 29 having a 60 degree gloss of at least 75, as defined by ASTM D523-89 (Re-Approved 1999).

31. A retroreflective coating system as set forth in claim 29 having a 60 degree gloss of less than 75, as defined by ASTM D523-89 (Re-Approved 1999).

32. A retroreflective coating system as set forth in claim 29 having a film build of from 10 to 100 microns.

33. A retroreflective coating system as set forth in claim 32 wherein a portion of said film build is removed after said color-providing composition and said clearcoat composition have been simultaneously cured to increase exposure of said retroreflective microspheres to an external light source.

34. A retroreflective coating system as set forth in claim 32 wherein a portion of said clearcoat film layer is sanded after said color-providing composition and said clearcoat composition have been simultaneously cured to increase exposure of said retroreflective microspheres to an external light source.

35. A retroreflective coating system as set forth in claim 1 wherein at least one of said color-providing composition and said clearcoat composition comprises phosphorescent pigment.

* * * * *